United States Patent [19]

Hegg

[11] Patent Number: 4,947,701
[45] Date of Patent: Aug. 14, 1990

[54] ROLL AND PITCH PALM PIVOT HAND CONTROLLER

[75] Inventor: Jeffrey W. Hegg, North Redington Beach, Fla.

[73] Assignee: Honeywell Inc., Minneapolis, Minn.

[21] Appl. No.: 392,543

[22] Filed: Aug. 11, 1989

[51] Int. Cl.$^5$ .............................................. B64C 13/04
[52] U.S. Cl. ................................ 74/471 XY; 244/236; 244/237; 74/523
[58] Field of Search .......................... 74/471 XY, 523; 244/228, 236, 237; 273/148 B

[56] References Cited

U.S. PATENT DOCUMENTS

| | | | |
|---|---|---|---|
| 3,771,037 | 11/1973 | Bailey | 244/237 |
| 4,012,014 | 3/1977 | Marshall | 74/523 |
| 4,875,383 | 10/1989 | Holman et al. | 74/471 XY |

Primary Examiner—Stephen C. Bentley
Attorney, Agent, or Firm—Haugen and Nikolai

[57] ABSTRACT

A two-axis hand controller including a human interface to simulate feel parameters for use in a vehicle having a pitch axis and a roll axis. A hollow grip having a base end is connected to a swash plate through a rigid connecting member. A universal joint having a center shaft member rigidly affixed to a first support surface and having roll and pitch pivot axis members is attached within the center of the hollow grip so as to provide dual palm pivot points. The swash plate includes an opening positioned so as to accept the shaft member through the opening and into the hollow grip. The swash plate is also flexibly engaged to the first support surface so as to allow for control of the human interface feel parameters. Apparatus for transducing is attached between the swash plate and the base so as to provide electrical signals responsive to movements in the pitch and roll axes without cross-coupling from one axis to the other. Adding an elongated shaft member attached to a bearing mechanism mounted to a second supporting surface provides a third axis in the yaw direction. The swash plate is flexibly attached to the first support surface by at least four linear bearings wherein two of the linear bearings are disposed along the pitch axis and the other two are disposed along the roll axis, wherein each of the linear bearings is further connected to a flexible coupling which is connected to the transducer apparatus comprising a pick-off device.

15 Claims, 3 Drawing Sheets

ROLL AND PITCH PALM PIVOT HAND CONTROLLER

BACKGROUND OF THE INVENTION

The invention is directed to aircraft and spacecraft hand controllers and, more particularly, to a two-axis side-stick hand controller for a pilot's or astronaut's roll and pitch inputs.

As a result of experience on certain space programs, including the Space Shuttle, it was learned that a controller having a pivot point for pitch at the center of the palm (i.e., a palm pivot) is a feature highly regarded by pilots and astronauts. The flight problems of the Space Shuttle during re-entry and landing are similar to those of an aircraft. The invention provides a palm pivot two-axis controller to be implemented in an aircraft. Space Shuttle and Apollo hand controllers built by the assignee are three-axis hand controllers with the following pivot point configuration:

Roll - 4.5 inches below grip palm center;
Pitch - center of grip palm; and
Yaw - center axis of the grip.

The Space Shuttle hand controller is mounted centrally between the astronaut's knees. In contrast, the palm pivot hand controller of the invention is designed to be a two-axis hand controller with roll and pitch pivot points configured into the center of the grip palm. The primary advantage of the invention is that both roll and pitch pivot axes are situated at the center of the palm. The invention employs a universal or cardan joint within the center of the controller grip. The cardan joint center is attached rigidly to a fixed base and the outside is attached to the grip. The two degree-of-freedom universal joint can consist of any of many specific configurations including a ball and socket or four bearings. In an alternate embodiment, the hand controller can be configured as a three-axis hand controller by constructing it so as to allow the base to rotate about the centerline of the grip.

SUMMARY OF THE INVENTION

A two-axis hand controller including a human interface to simulate feel parameters for use in an aircraft or spacecraft having a pitch axis and a roll axis is provided by the invention. A means for gripping has a base end connected to a rigid connecting member. The gripping means includes a central hollow space. A means for transmitting rotation having a center shaft member and having roll pivot axis and pitch pivot axis members is attached within the center of the hollow space so as to provide dual palm pivot points. The shaft member has top and bottom ends. The rigid connecting member includes first and second ends and an opening. The first end is rigidly affixed to the base end of the gripping means and positioned so as to accept the top end of the shaft member through the opening into the hollow space. The opening is sufficiently sized to accept the shaft member without the shaft member coming into contact with the rigid connecting members. The bottom end of the shaft member is rigidly affixed to a first support surface. A swash plate is also flexibly engaged to the first support surface so as to allow for control of the human interface feel parameters. Means for transducing is attached between the swash plate and the first support surface so as to provide electrical signals responsive to movements in the pitch and roll axes without cross-coupling from one axis to the other.

In the preferred embodiment of the invention the swash plate is flexibly attached to the first support surface by at least four linear bearings wherein two of the linear bearings are disposed along the pitch axis and the other two are disposed along the roll axis, wherein each of the linear bearings is further connected to a flexible coupling which, in turn, is connected to the transducer means comprising a pick-off device.

In an alternate embodiment of the invention a three-axis hand controller is provided by modifying the two axis hand controlling by adding a second support surface, an elongated shaft member which is extended through an opening in the first support surface and a bearing mechanism including a feel mechanism for providing yaw signals.

OBJECTS OF THE INVENTION

It is one object of the invention to provide a two-axis hand controller including a human interface to simulate feel parameters for use in an aircraft wherein both roll and pitch pivot axes are situated at the center of the palm.

It is yet another object of the invention to provide a two-axis hand controller having a swash plate for supporting the hollow grip and for interfacing between the grip and transducer assemblies for each axis.

It is yet another object of the invention to provide a two-axis hand controller having a hollow grip within which a universal joint or cardan joint is affixed so as to allow movement in the pitch and roll directions translating the movement via the swash plate to transducer apparatus which supplied signals to aircraft controls.

It is still another object of the invention to provide a three-axis hand controller wherein yaw axis rotation is added to the two-axis hand controller of the invention.

Other features, objects and advantages of the invention will become apparent to those skilled in the art through the description of the preferred embodiment, drawings and claims herein. In the figures, like numerals refer to like elements.

DESCRIPTION OF THE PREFERRED EMBODIMENT

Figure 1:
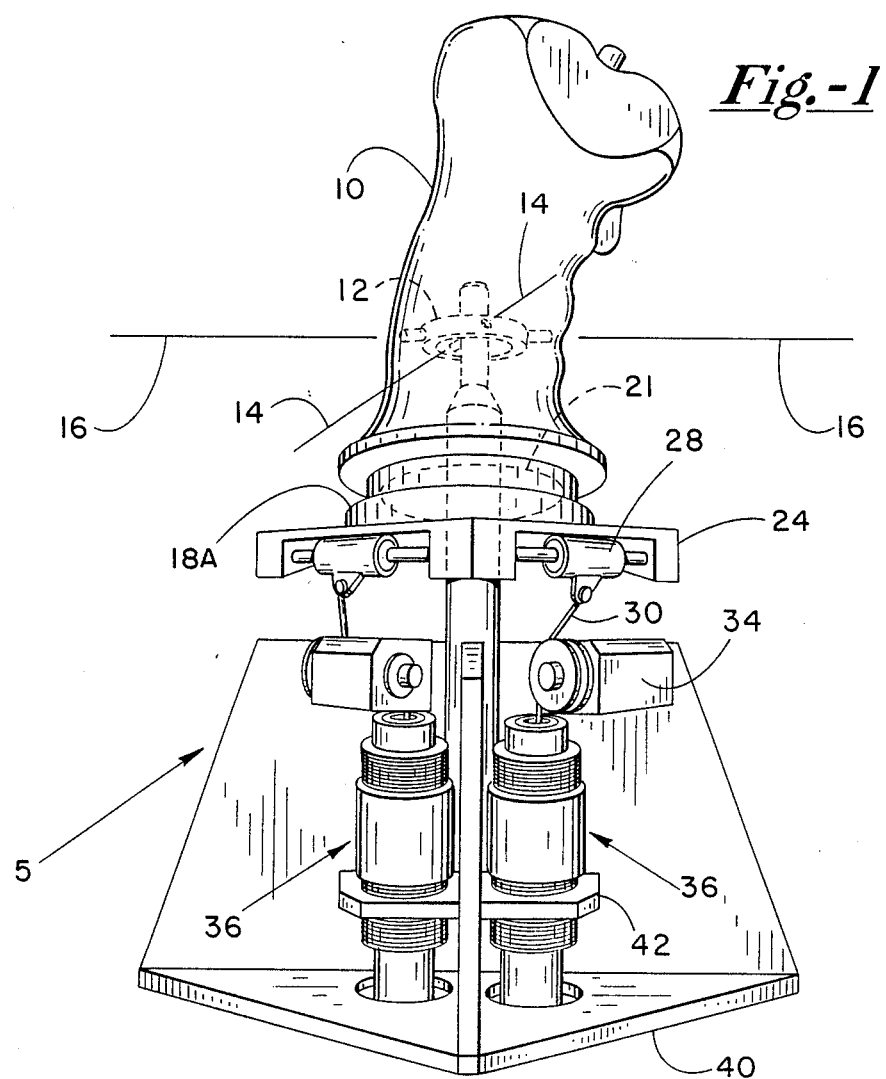
FIG. 1 shows schematically the hand controller of the invention in an isometric view.

Referring now to FIG. 1 an embodiment of the two-axis hand controller of the invention is shown. It will be understood that the hand controller provided by the invention may be used in aircraft, spacecraft or similarly controlled vehicles. The embodiment 5 comprises a hollow grip 10, universal or cardan joint 12, pitch axis 14, roll axis 16, rigid pedestal or shaft 20, swash plate 24 including opening 21, rigid connecting member 18A between the grip and swash plate, linear bearings 2B, flexible coupling 30, pulley assemblies 34, plunger/pick-off assemblies 36, base 40 and mounting plate 42. The cardan joint 12 has a center shaft member 20 affixed rigidly to the base 40. The cardan joint 12 further has roll and pitch pivot axis members 14 and 16 attached within the center of the hollow space within the grip 10 to provide dual palm pivot points. The swash plate 24 has first and second surfaces wherein the first surface is rigidly affixed to the grip member 10 by hollow rigid connecting member 18A and positioned so as to accept the shaft member 20 through the opening 21 and into the hollow space within grip 10. In the preferred embodiment of the invention, the swash plate 24 also provides means for mounting a plurality of at least four linear bearings 28. Further, the linear bearings 28 are aligned in parallel pairs along the roll and pitch axes and mounted to the swash plate. Further, the linear bearings 28 are preferably individually coupled by means of flexible couplings 30 to plunger/pick-off assemblies 36. The flexible coupling 30 is advantageously routed through pulley assembly 34. In the preferred embodiment of the invention, four sets of linear bearings, flexible couplings, pulley assemblies and plunger/pick-off assemblies are included in order to proVide means for providing electrical signals in response to movements in the roll +, roll −, pitch +, and pitch − directions. The plunger/pick-off assemblies 36 are mounted to mounting plate 42 as explained herein with reference to FIG. 2.

Figure 2:
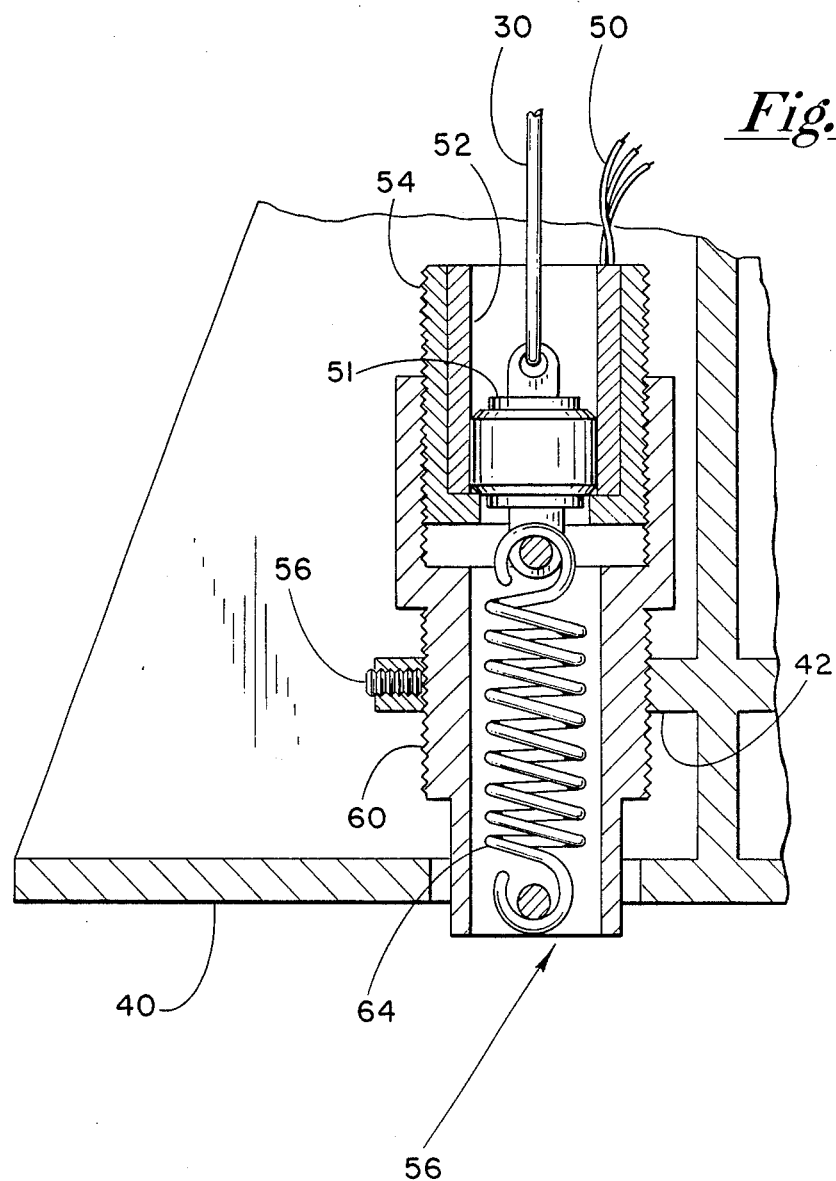
FIG. 2 shows schematically a cutaway view along lines A—A of a plunger/pick-off assembly as employed by the invention.

Now referring to FIG. 2, a cut-away view of one plunger/pick-off assembly 36 along line 2—2 is shown. Each plunger/pick-off assembly 36 preferably comprises conductors 50 for providing pick-off signals, an LVDT pick-off 52, break-out adjusting threads 54, locking set screw 56, null adjusting threads 60, extension spring 64 and LVDT core and plunger 51. The plunger/pick-off assembly is rigidly mounted to the mounting plate 42 by means of the null adjusting threads 60 and a locking set screw 56. The flexible coupling 30 is attached to the linear motion bearings on the swash plate 24. Hence, when the grip is displaced in one axis, it will not cause coupling to the opposite axis because the linear bearings will be correspondingly displaced. The swash plate motion is controlled by the cooperative interaction of the four flexible couplings attached to the linear bearings at one end and the extension springs and plungers at the other. The preload on the springs (i.e., break-out of the grip) is controlled by the internal null adjustment threads 60 which are locked in place by set screw 56. The spring assembly is adjustable to reduce dead band to a minimum. In this fashion, break-out and dead band for roll +, roll −, pitch + and pitch − are independently adjustable. Also, once break-out is overcome in one axis, there will be a channel effect in the other because the break-out in the opposite axis must be overcome to be displaced in that direction.

Figure 3:
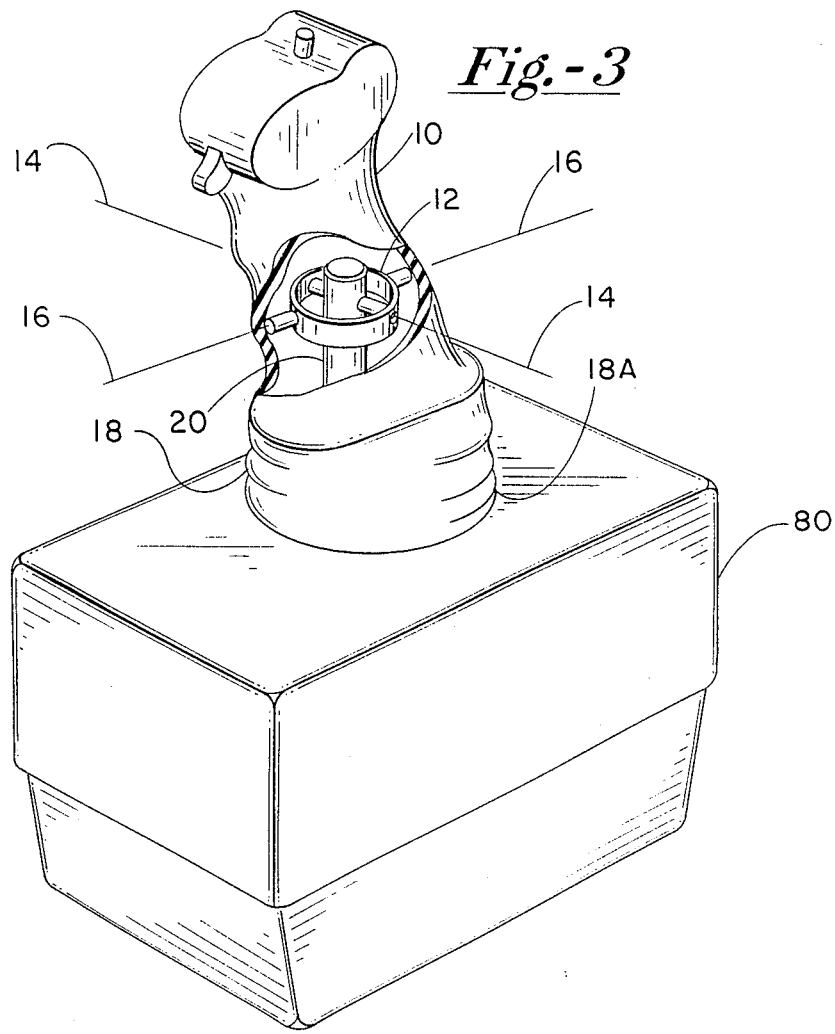
FIG. 3 shows schematically another view of the hand controller of the invention illustrating the interface between the grip, boot and housing members.

Now referring to FIG. 3, the base of the grip 10 is attached to one end of a flexible boot 18. The other end of the boot is attached to a housing member 80. The housing member is rigidly mounted to the supporting base 40. Since the boot is made of a flexible material, it will flex with movement of the grip, thereby providing a contamination seal for the internal mechanisms. The boot may be made of any suitable, flexible material such as rubber or other similarly flexible materials.

Having described the configuration and elements of the invention, the operation of the invention will now be described in the context of use of the invention in an aircraft. It will be understood that this is only an illustrative example of one use of the hand controller and is not intended to so limit the invention. Continuing reference is drawn to FIGS. 1 and 2. As a pilot grips the hand controller 5 and moves it in any direction, the plurality of linear bearings and flexible couplings will also be moved by the swash plate which is rigidly affixed to the controller. The universal joint 12 will allow movement in either of the two axes. As the swash plate 24 moves with the handle, the LVDT core and plunger 51 will be moved upwards or downwards in response to the movement of the swash plate and linear bearings. As the LVDT core and plunger move in response to the swash plate movement, the LVDT pick-off 52 will cause electrical signals to be transmitted to the wires 50. These electrical signals will correspond in magnitude to the movement of the grip 10. The pick-off signals will then be sent to a control (not shown) for ultimately moving the aircraft in the pitch or roll direction. The extension springs 64 give the pilot a "feel" on the grip which corresponds to the movement of the aircraft in a given direction. For example, when he pushes forward hard into the pitch direction, he would expect a radical adjustment in pitch and a correspondingly stronger resistance by the grip. Thus, he can "feel" that he is controlling the aircraft movements, although actual movement of the aircraft is accomplished through well-known electromechanical means activated by his applications of force to the grip.

Figure 4:
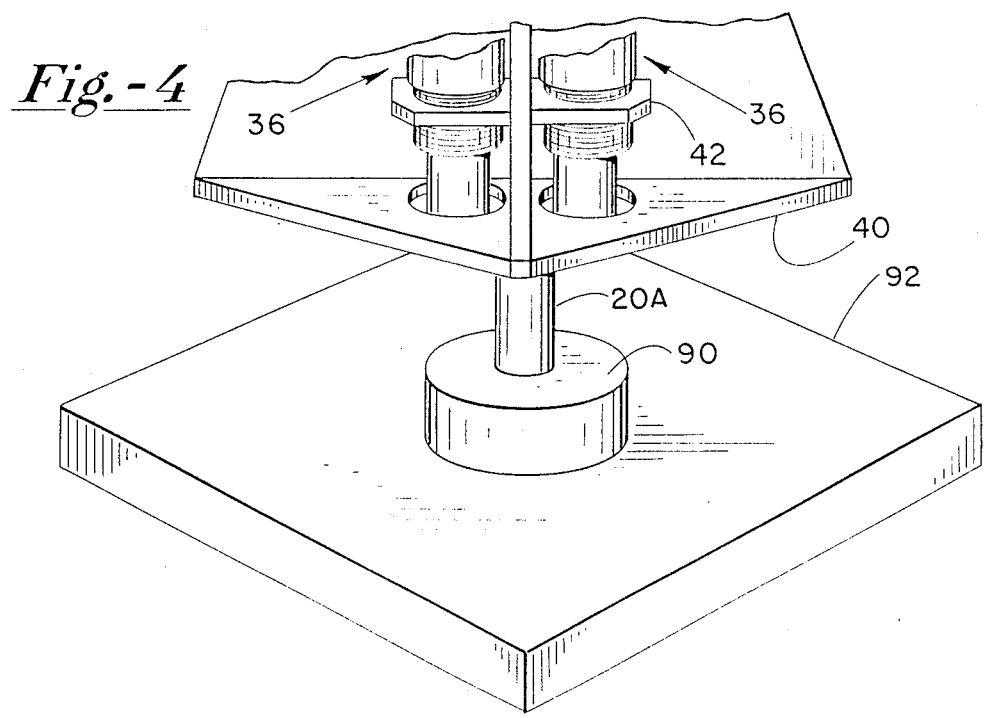
FIG. 4 shows schematically an elongated shaft, second supporting base and bearings required to implement a three-axis controller.

An alternative embodiment of the invention is shown in FIG. 4. FIG. 4 shows schematically a shaft extension member 20A, bearing mechanism 90 and a second rigid support base 92 which may be added to the two-axis configuration of the invention so as to provide yaw axis rotation. The shaft extension member 20A is an extension of shaft 20 through an opening in the first support surface. The shaft is attached to the bearing mechanism 90 which is comprised of well known feel mechanisms such as springs with scissors. The bearing mechanism 90 is then rigidly mounted to the second support surface 92. The combination of the shaft extension, bearing mechanism and second support base operates so as to allow base 40 to rotate about the center line of the grip, thereby providing a simulated feel parameter in the Yaw axis in addition to the pitch axis and the roll axis.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A two-axis hand controller apparatus including a human interface to simulate feel parameters for use in a vehicle having a pitch axis and a roll axis comprising:
    (a) a control grip having a hollow space and a base end;
    (b) a first support surface;
    (c) a universal joint having two degrees of freedom, having a center shaft member with top and bottom ends affixed rigidly at bottom end to the first support surface and having roll axis and pitch pivot axis members attached within the center of the hollow space so as to provide dual palm pivot points;
(d) a rigid connecting member attached at a first end to the control grip base and having a second end;
(e) a swash plate having first and second surfaces and an opening wherein the first surface is rigidly affixed to the second end of the rigid connecting member and positioned so as to accept the top end of the shaft member through the opening without contact into the hollow space, and further wherein the swash plate is flexibly engaged to the first support surface by apparatus including at least four linear bearings wherein two of the linear bearings are disposed along the pitch axis and the other two are disposed along the roll axis, wherein each of the linear bearings is further connected to a flexible coupling, and wherein the flexible coupling is further connected to the transducer means which includes a pick-off device, so as to allow for control of the human interface feel parameters with full grip displacement; and
(f) transducer means attached between the swash plate and the first support surface so as to provide electrical signals responsive to movements in the pitch and roll axes without cross-coupling from one axis to the other.

2. The apparatus of claim 1 wherein the transducer means comprises a plurality of plunger and pick-off assemblies.

3. The apparatus of claim 2 wherein each of the plunger and pick-off assemblies further comprises:
(a) means for mounting to the first supporting surface;
(b) means for flexibly extending the plunger;
(c) means for housing the plunger;
(d) means for adjusting preload on the extending means; and
(e) means for providing an electrical signal responsive to movements of the hand controller in the pitch and roll axes.

4. The apparatus of claim 3 wherein the means for providing an electrical signal further includes an LVDT pick-off and core which outputs electrical signals in response to movement of the plunger within the housing means.

5. The apparatus of claim 3 wherein the means for mounting to the first supporting means further includes means for adjusting a null signal so as to reduce deadband responses to a minimum.

6. The apparatus of claims 3 wherein the means for mounting to the base further includes a locking set screw.

7. The apparatus of claim 3 wherein the apparatus attaching the swash plate to the first support surface further includes a pulley assembly which engaged by the flexible coupling.

8. The apparatus of claim 1 further including a housing mounted to the first support surface and a flexible boot connected at a first end to the base of the grip and at a second end to the housing.

9. A three-axis hand controller apparatus including a human interface to simulate feel parameters for use in a vehicle having a pitch axis and a roll axis comprising:
(a) means for gripping having a hollow space and a base end;
(b) a first support surface;
(c) means for transmitting rotation having a center shaft member with top and bottom ends wherein the bottom end is affixed rigidly to the first support surface, and having roll pivot axis and pitch pivot axis members attached within the center of the hollow space so as to provide dual palm pivot points;
(d) a rigid connecting member attached at a first end to the control grip base and having a second end;
(e) a swash plate having first and second surfaces and an opening wherein the first surface is rigidly affixed to the second end of the rigid connecting member and positioned so as to accept the top end of the shaft member through the opening without contact and into the hollow space, wherein the swash plate is flexibly engaged to the first support surface, so as to allow for control of the human interface feel parameters with full grip displacement, by apparatus including at least four linear bearings wherein two of the linear bearings are disposed along the pitch axis and the other two are disposed along the roll axis, wherein each of the linear bearings is further connected to a flexible coupling and wherein the flexible coupling is further connected to the transducer means which includes a pick-off choice;
(f) means for transducing attached between the supporting means and the first support surface so as to provide electrical signals responsive to movements in the pitch and roll axes without cross-coupling from one axis to the other;
(g) an elongated shaft member colinearly connected to the center shaft member at a first end and having a second end;
(h) a bearing mechanism connected to the second end of the elongated shaft member, the bearing mechanism including a feel mechanism for providing yaw signals; and
(i) a second support surface attached to the bearing mechanism.

10. The apparatus of claim 9 wherein the transducer means further comprises a plurality of plunger and pick-off assemblies.

11. The apparatus of claim 10 wherein each of the plunger and pick-off assemblies further comprises:
(a) means for mounting to the first supporting surface;
(b) means for flexibly extending the plunger;
(c) means for housing the plunger;
(d) means for adjusting preload on the flexibly extending means; and
(e) means for providing an electrical signal responsive to movements of the hand controller in the pitch and roll axes.

12. The apparatus of claim 11 wherein the means for providing an electrical signal further includes an LVDT pick-off and core which output electrical signals in response to movement of the plunger within the housing.

13. The apparatus of claim 11 wherein the means for mounting to the first support surface further includes means for adjusting a null signal so as to reduce deadband responses to a minimum.

14. The apparatus of claim 13 wherein the means for mounting to the first support surface further includes a locking set screw.

15. The apparatus of claim 11 wherein the apparatus attaching the swash plate to the first support surface further includes a pulley assembly which is engaged by the flexible coupling.

* * * * *